4 Sheets—Sheet 1.

F. B. A. ROYER de la BASTIE.
TEMPERING GLASS AND FURNACE THEREFOR.

No. 169,783. Patented Nov. 9, 1875.

Witnesses
H. Shumway.
Clara Broughton.

F. B. A. Royer de la Bastie
Inventor
By Atty
Wm. E. Earle

4 Sheets—Sheet 2.

F. B. A. ROYER de la BASTIE.
TEMPERING GLASS AND FURNACE THEREFOR.

No. 169,783. Patented Nov. 9, 1875.

Witnesses:
H. Shumway
Clara Broughton

F. B. A. Royer de la Bastie
Inventor
By Atty
John E. Earle

4 Sheets—Sheet 4.

F. B. A. ROYER de la BASTIE.
TEMPERING GLASS AND FURNACE THEREFOR.

No. 169,783. Patented Nov. 9, 1875.

Witnesses.
H. Shumway,
Clara Broughton.

F. B. A. Royer de la Bastie
Inventor
By Atty.
John S. Earle

UNITED STATES PATENT OFFICE.

FRANÇOIS B. A. ROYER DE LA BASTIE, OF PARIS, FRANCE.

IMPROVEMENT IN TEMPERING GLASS AND FURNACES THEREFOR.

Specification forming part of Letters Patent No. 169,783, dated November 9, 1875; application filed October 5, 1875.

*To all whom it may concern:*

Be it known that I, F. B. A. ROYER DE LA BASTIE, of Paris, in the Republic of France, have invented a new Improvement in Tempering Glass and Furnace therefor; and I do hereby declare the following, when taken in connection with the accompanying drawings and the letters of reference marked thereon, to be a full, clear, and exact description of the same, and which said drawings constitute part of this specification, and represent, in—

Figure 1:
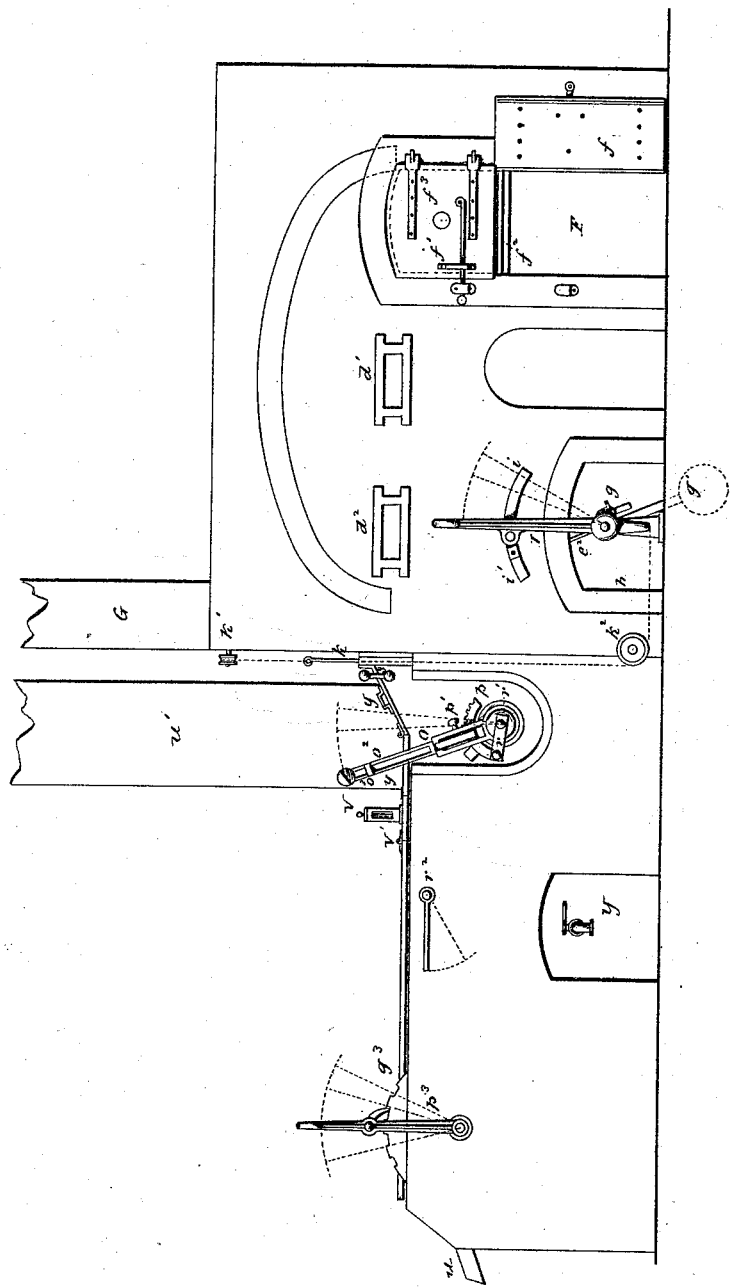
Figure 2:
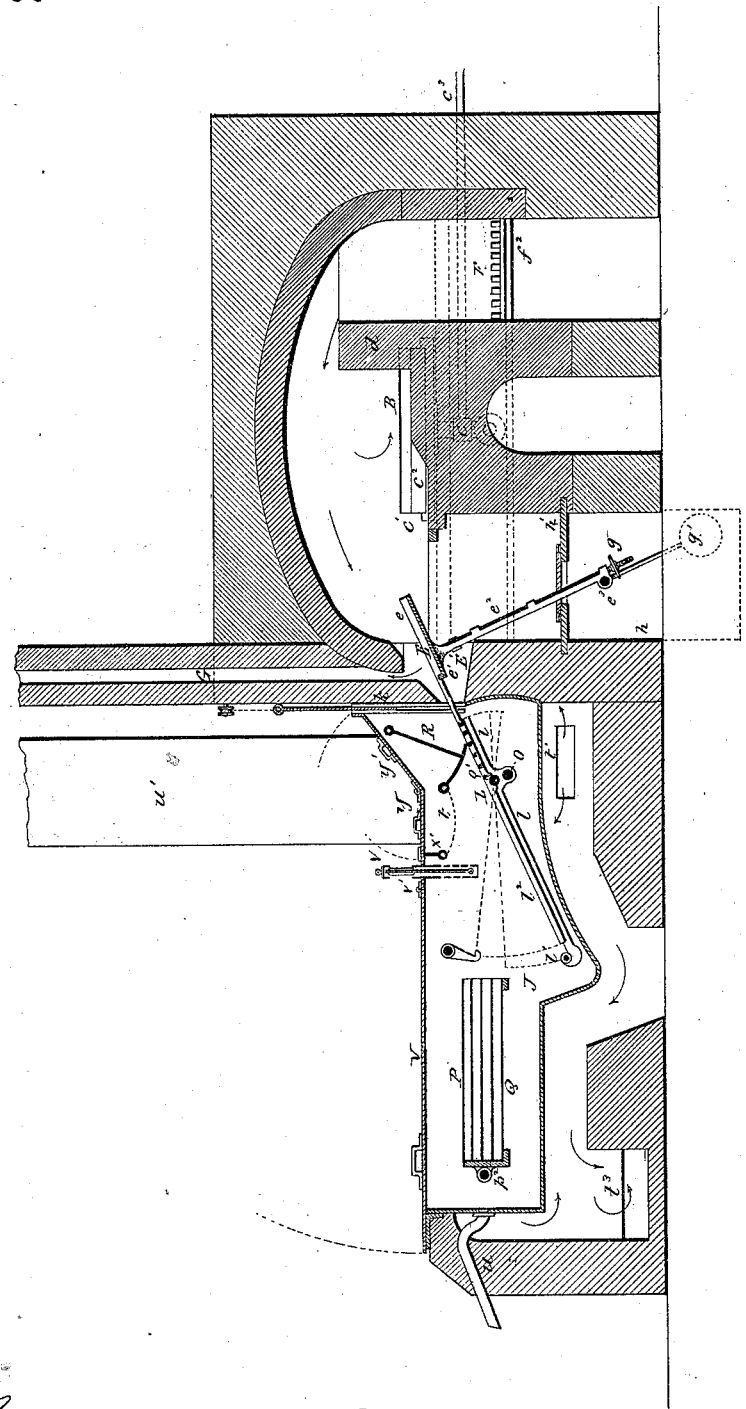
Figure 3:
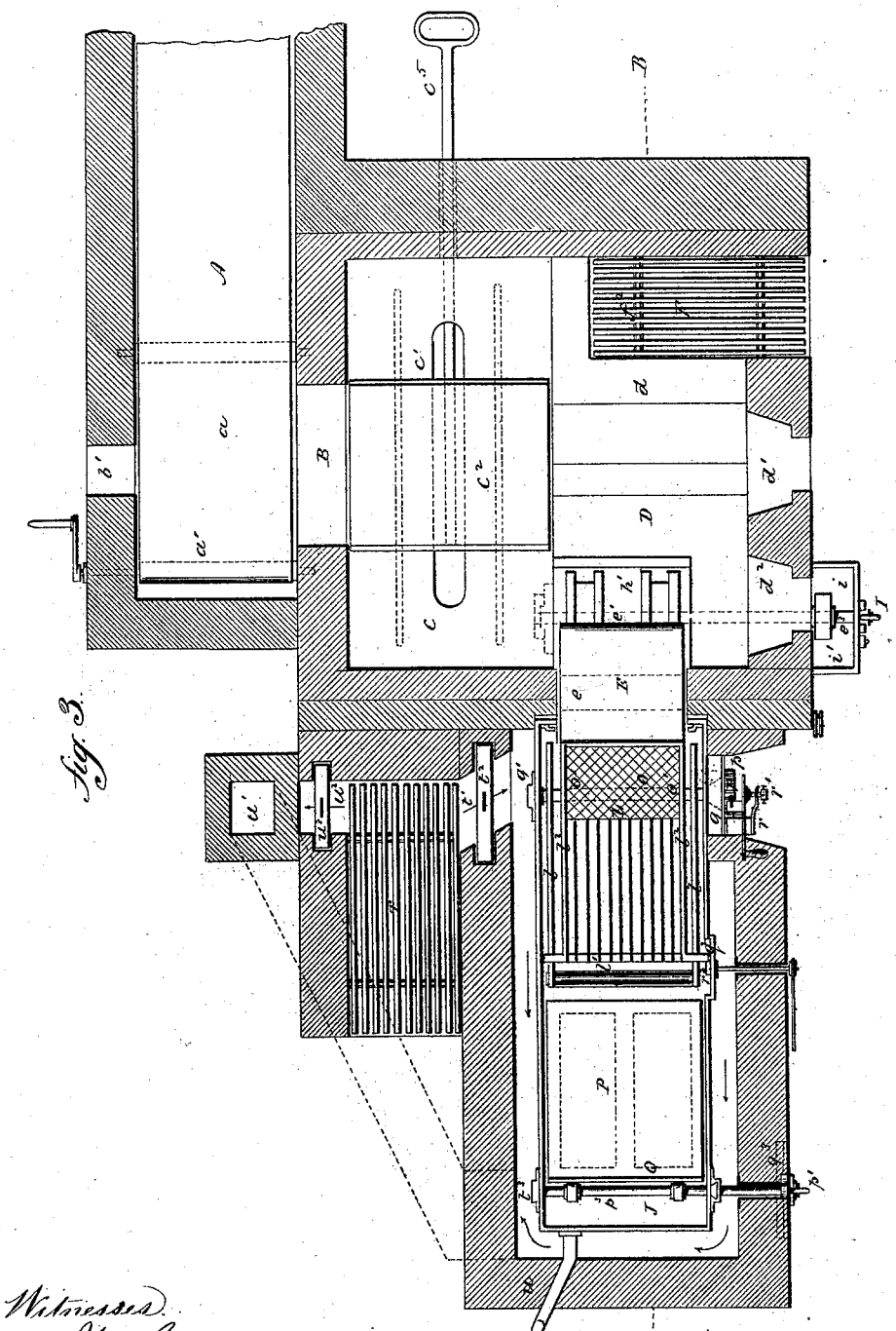
Figure 4:
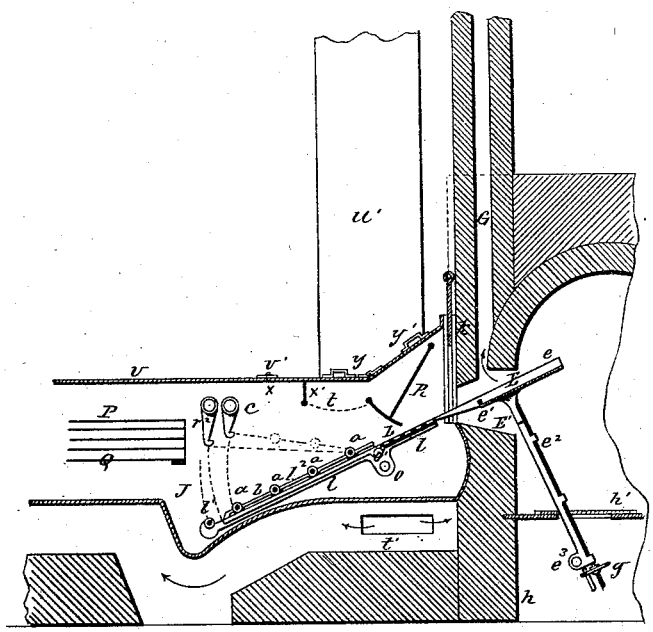

Figure 1, side view; Fig. 2, vertical section; Fig. 3, horizontal section; Fig. 4, modification.

This invention relates to an improvement in the apparatus for tempering glass for which Letters Patent of the United States were granted to this applicant, dated December 15, 1874, No. 157,717, the object of this invention being to facilitate the transfer of the glass from one part of the apparatus to another, as well as to adapt the apparatus to the hardening of special articles.

In illustrating this invention the whole apparatus, as shown in the original patent, is represented, together with the improvements, and in order to the clear understanding of the improvements it will be necessary to describe in connection with them the whole apparatus; and it consists in the construction of the apparatus, as hereinafter described, and more particularly recited in the claims.

The auxiliary heating-room A consists of a long compartment constructed adjacent to the furnace, and communicating with it by a large, but very low, opening, B. This auxiliary or preliminary heating-room may be provided with an independent furnace, or receive its heat from the principal furnace. In this heating-room is placed longitudinally, and upon rollers, an endless metallic apron, $a$, on which the leaves of glass are placed one after the other. These leaves of glass are heated for being tempered. The roll $a'$, at one extremity of the apron, near the opening B, is fixed upon a shaft passing through the wall to the outside, where a crank for turning the roll is fitted to the shaft; or power may be applied for imparting movement to the endless apron in any other convenient manner. When a leaf arrives before the opening B the workman, by means of a long fork and plate which he passes through the opening $b'$, raises the sheet slightly, and transfers it through the opening B, conducting it into the compartment C, there to be heated to a malleable state. This auxiliary compartment A, with its endless apron, thus affords a convenient means for introducing the glass to the final heating-compartment C. The leaf of glass is received in the compartment C on a movable carriage of rectangular form. This carriage consists of a cast-iron frame, $c^1$, supported by guides on rails placed upon the bottom of the oven. It carries a refractory earthen stone, $c^2$, for receiving the glass, and is flush with the lower side of the opening B.

For obtaining the best tempering it is indispensable that the leaf of glass be equally heated in all its parts. For this purpose the carriage is reciprocated forward and back in the compartment C by a long rod, $c^3$, through the side of the oven, and terminating in a handle for facilitating the work.

For utilizing almost entirely the heat of the oven, and also to insulate as much as possible the metallic parts of the carriage $c^1$, a refractory brick arch, $c$, is constructed in the lower part of the compartment C. The carriage $c^1$ is supported upon this arch.

Figure 5:
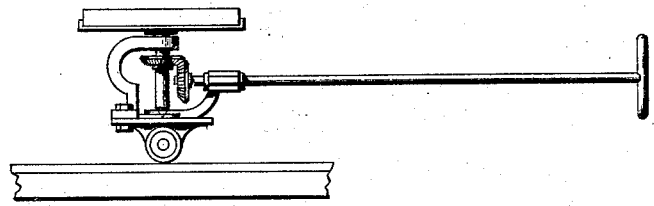

In case it is desired to employ a rotative carriage, mechanism such as shown in Fig. 5 is applied to the center of the carriage, and the carriage made circular. This species of rotating carriage possesses the advantage of obtaining equal heat on all the parts of the leaf of glass, which will be placed upon the carriage at the entrance of the heating-room A.

The oven is divided into two compartments, C and D, heated from a furnace, F, closed by two doors, $f$ and $f^1$. The door $f$, of which the upper end is flush with the grate $f^2$, is twice the height of the door $f^1$. This last is pierced with a small opening, $f^3$, through which the interior of the oven may be seen, without opening the door $f^1$.

The flame rises in the furnace F, passes over the abutment $d$, and is turned by the arch of the furnace into the compartments D and C, from whence it escapes by the opening B for heating the room A.

When the leaf of glass has been sufficiently heated on the carriage, the carriage is moved to the depths of the oven, beside the rocking table E—the surface of the table at that time being flush and level with the surface of the carriage, or substantially so. Then the workman, operating through apertures $d^1$ $d^2$, draws the leaf of glass from the carriage onto the table E. This table is made of a refractory earth or stone, $e$, its surface coated with porcelain or other vitreous material. This stone $e$ rests upon a cast-iron plate $e^1$, and is supported from a shaft, $e^3$, by rods or supports $e^2$, made adjustable vertically by means of a screw and wheel, $g$, and is provided with a counter-balance, $g^1$, below the shaft $e^3$, to preserve the equilibrium of the table in its movement, when being turned upon the shaft $e^3$. To avoid driving back the flame from the higher parts of the oven, so as to escape through the opening $h$, and to avoid the introduction of air through the opening $h$ and the opening B of the heating-room when the table E is turned down as in Fig. 2, a plate, $h'$, is placed above the vault of the opening $h$. This plate is pierced in two rectangular slots for the support of the table to work in. These slots are at all times closed by a sliding cover, which moves with the table-supports.

The heat in the oven is regulated by the chimney G, by any suitable damper or register.

As soon as the glass leaf is drawn upon the table E, the workman, by means of an outside lever, I, on the shaft $e^3$, turns the table toward the vat J, containing the tempering-bath. This bath is arranged in suitable masonry outside the furnace. The lever I works against a sector, $i$, until it strikes a stop, $i'$, limiting the movement of the table. This stop $i'$ may be adjusted to different positions upon the sector $i$, according to the change of the dimensions of the stone. To avoid the passage of the heated air from the furnace into the vat J, which would occasion the inflaming of the liquids composing the bath, the opening E′, for the passage of the table E, is closed by a vertical slide, $k$. This slide $k$ is supported by a chain passing over the pulley $k^1$, and down and around another pulley, $k^2$, below the oven, and fixed to an arm projecting downward from the lever I. Hence, when the lever I is turned to carry the table toward the vat, it simultaneously raises the slide $k$, and, returning the table, the slide closes of its own gravity. On its entrance into the vat J, the glass sheet is received by a grate, L, lying in the plane of the table E, Figs. 2 and 3, when turned toward the vat. This grate consists of a frame which carries the principal grate. The two sides $e e$ of this frame are raised slightly above the upper surface of the grate, so as to guide the glass in its passage from the table onto the grate. At the lower end the frame is provided with a roll or cushion, $l^1$, to receive the lower edge of the glass as it descends upon the grate, to prevent such a shock to the glass as would injure it. The sides of the frame $l$ are supported on a transverse shaft, $o$.

The principal grate L rests upon studs $o^1$ on the sides of the frame or on the shaft. This principal grate consists of an iron frame, $l^2$. That part of the surface of the grate next the table is composed of lozenge-shaped openings, the bars presenting a sharp edge upward. The lower part is composed of parallel blades, but in connection and flush with the upper part. The cross-bar at the lower end of the grate projects at its two ends, so as to rest upon the sides $l\ l$.

This construction of grate enables the exposing of almost the entire surface of the glass to the tempering of the liquid.

When the glass has been immersed sufficiently to produce the required tempering, the grate L is turned into a horizontal position by means of a lever, $o^1$, on the outer end of the shaft $o$. This lever is composed of two parts. The first, $o^2$, is fixed upon the shaft, and a second, $o^3$, sliding upon the first. This last, $o^3$, is furnished at its base with a talon, working in a groove in the principal lever $o^2$. Following the position which they have given to the grate, this talon will enter the notches around the sector P, fixed against the side of the vat J. The position of the grate is regulated by a screw, $p^1$, in the stock of the piece $o^3$, and bearing upon a stay on the sector $p$. For changing the position it is sufficient to press together the handles of the two parts $o^2$ and $o^3$ of the lever. While pushing to one side or the other the stock of the lever $o^3$ clears itself from the sector $p$, and when the grate is in the desired position, loose the handles of the lever, and, immediately, the talon will be forced into connection with the sector by a small spring placed between the handles. The shaft $o$, carrying the grate, is hung in packed bearings $g$ and $g^1$. These packed journals prevent the escape of the liquid. A strong spring, $r$, placed against the sector $p$, is constantly pressing against the end of the shaft. This augments the friction, serving to curb the movement of the lever $o$. A screw, $r^1$, at the end of the spring serves to increase the tension, added to which, if need be, a balance-weight is applied upon the outside end of the shaft $o$, for equalizing the movement of the grate, so that it will operate in connection with the movable table E.

For certain thicknesses of glass a modified grate is used, as represented in Fig. 1, Plate 3, and of which the description is hereafter given.

When the grate is turned by the lever $o^1$ to the horizontal position, the projecting end $g^2$ of the grate-frame will engage a hook, $r^2$. This hook is hung upon an axis, which passes through the wall of the vat, and terminates in a lever, $r^2$, which serves as a handle. The hook engages the frame $l^2$, and holds it in a horizontal position. The grate held in this position, the lever $o^1$ is turned to carry down the frame $l\,l$, and with it the cushion $l^1$; then open the cover of the vat J, and, by means of a rake, the workman brings the tempered glass plate forward into a case or sheath in the compartment P, placed upon a frame, Q, which is movable. This done, the frame $l\,l$ is then brought up to the suspended grate, and that detached from the hook, the grate, and frame together are lowered into the vat to receive a second plate of glass from the table E.

The case P is of slender sheet-iron, and is divided into several compartments, destined to receive these tempered leaves. It is placed in the vat J, upon a cast-iron frame, Q, having at the rear two supporters, in which it is placed, and is attached to a shaft, $p^2$, placed transversely, and carried in the vat J, like the shaft $o$ of the grate L. At the outside extremity of the shaft $p^2$ is placed an oscillating lever, $p^3$, against a sector, $g^3$, which is adapted to the surrounding walls of the vat, the shape preventing its encroaching upon the corresponding walls of the case P. Thus acting upon the lever $p^3$, they will present successively each compartment of the case before the grate for receiving the tempered glass. A catch fixed upon the lever $p^3$, and hooking itself into the notches of the sector $g^3$, keeps the frame Q, and, in consequence, the case P, in the required position.

There is often on the surface of the bath, of which the level is indicated in broken lines, Fig. 2, dirt or crust, which will prevent the glass leaf from entering into the liquid, or, at least, put it out of shape, in consequence of its malleable state. To guard against this inconvenience a skimmer, R, moved by a rod or crank, is placed in the vat J, near the point of communication with the furnace. When the workman is ready to lower the movable table to introduce the hot leaf into the bath, he turns the crank S to move the skimmer R, which disturbs the crust upon the surface, thus removing the hinderance to the passage of the glass. The crust is received in a basket of metallic cloth, $t$, where it is drained off, and removed when a quantity has accumulated.

The level of the bath in the vat J will be always the same—that is to say, it will not rise above a certain height, indicated by a siphon, $u$, arranged at the end of the vat, all surplus above this point passing off through the siphon.

It will sometimes happen that, in sliding the leaves of glass on the grate, one or more of them will be broken. The broken glass will fall to the bottom of the vat, and under the action of the heat will make a paste, which will add to the solidity at the bottom of the vat. To overcome this inconvenience a metallic cloth may be placed a little above the bottom of the vat. This cloth receives the broken glass, which will produce no bad effect, and can be easily taken out of the vat.

The vat J is made of metal of a convenient thickness, and has its edges covered with iron turned outward, so as to be supported upon the brick walls that surround it. Between the walls of the furnace and the vat, and also under the vat, is a space for the passage of the flame which heats the bath. This flame proceeds from a furnace at the side of the vat. The flame is directed under the vat by a flue, $t^1$, which may be intercepted, if necessary, by a register, $t^2$. It is cleared by an orifice, $t^3$, and passes through a subterranean passage, which drives it to the chimney $u^1$. The chimney is provided with a register or an ordinary hood.

When it is necessary to prevent the flame from passing under the vat it is conducted into the chimney $u^1$ by the flue $u^2$, the opening of which is regulated by a register.

The vat J is covered by a plate divided into four parts, and forming a cover. The first part, $v$, covers the two sections of the vat, hinged at $v'$. Adjoining the part $v$ is a fixed part, and then a door, $y$, which is opened to raise the crust contained in the metallic basket, and proceeding from the skimmer; and, last, another door, $y'$, which allows the movement of the movable table E and the grate to be seen. These last two doors are hinged at the same point, and all three are furnished with handles for opening.

At the stationary part of the cover is fixed a thermometer, by which to tell the temperature of the bath. Under the part $x$ of the cover is fixed a plate, $x'$, which carries the basket to receive the skimmer. This plate $x'$ has another advantage—that is, of maintaining the rigidity of the transverse position of the cover, and dividing the vat into two parts. From the part $x$ a pipe leads through the cover, communicating with the chimney $u^1$. By this pipe, the opening of which will be regulated by a register, the vapor arising from heating the bath may be carried off. At last, in the front wall of the vat is a cock, designed to empty the vat when not needed. A modification of the grate, for the purpose of tempering light sheets of glass, or such as are liable to be easily turned out of their course in passing onto the grate, is shown in Fig. 4. In this several small rolls, $a$, of metallic cloth are arranged above the grate, leaving sufficient space for the passage of the glass between them and the grate. These rolls are supported on each side in the vertical pieces of iron $b$, resting edgewise between the grate proper and the supporting-grate, hinged at one end upon the shaft $o$, the opposite end supported upon the cleats $g^2$. When it is desirable to remove the tempered glass leaf from the grate into the case P to other compartments, it is raised, as before described, until the edge of one side of the frame carrying the rolls $a$ strikes the hook $c$, which engages it and holds it suspended. The grate $l^2$ is then held in a horizontal position by a hook, $r^2$, and the leaf is removed into the case P. Releasing the grate from the hooks $r^2$ and $c$, the grate is lowered by means of the lever $o$.

I claim—

1. In a glass-tempering furnace, substantially such as described, the combination of the principal heating-room A with its endless apron $a$, operating substantially as described, to partially heat and present the plate before the opening B in the principal furnace.

2. In a glass-tempering furnace, substantially such as described, the reciprocating receiving-carriage $c^1$, substantially as described.

3. The combination, in a glass-tempering furnace, of the reciprocating receiving-carriage $c^1$, the oscillating table E, and the receiving-grate in the bath, the said oscillating table arranged and operating to receive the sheet from the carriage and carry it to the bath, substantially as described.

4. The combination of the oscillating or transferring table E, the vertical slide K, and the lever I, in connection with and so as to operate both the table and the slide, substantially as and for the purpose described.

5. The combination, in a glass-tempering bath, of the skimmer R and receiver $t$, substantially as and for the purpose described.

6. The combination of the receiving-grate L, in the bath of a glass-tempering furnace, with the receptacle P, constructed with several independent compartments, and hung at the rear end, and provided with a lever, $e^3$, whereby either of the said compartments may be presented to receive the tempered sheets, substantially as described.

7. In combination with the receiving-grate in a glass-tempering bath, the rolls $a$, arranged in a frame hinged to the principal grate, substantially as and for the purpose set forth.

In witness to the foregoing specification and description I have hereto signed my name.

FRANÇOIS BARTHELEMY ALFRED ROYER DE LA BASTIE.

Witnesses:
GEORGE LE ROY,
YVAN MORELLER.